(12) United States Patent
Rhoten et al.

(10) Patent No.: US 7,549,154 B2
(45) Date of Patent: Jun. 16, 2009

(54) EXTENSIBLE ARCHITECTURE FOR AUXILIARY DISPLAYS

(75) Inventors: Matthew P. Rhoten, Kirkland, WA (US); Andrew J. Fuller, Redmond, WA (US); Roger H. Wynn, Redmond, WA (US); Michael S. Bernstein, Bothell, WA (US); Daniel J. Polivy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1017 days.

(21) Appl. No.: 10/996,634

(22) Filed: Nov. 23, 2004

(65) Prior Publication Data

US 2006/0130072 A1 Jun. 15, 2006

(51) Int. Cl.
- *G06F 3/00* (2006.01)
- *G06F 9/44* (2006.01)
- *G06F 9/46* (2006.01)
- *G06F 13/00* (2006.01)

(52) U.S. Cl. .................. 719/321; 719/313; 719/322; 719/323; 719/327; 719/328; 710/8

(58) Field of Classification Search ................ 719/313, 719/321–323, 327–328; 710/1, 8; 717/174
See application file for complete search history.

(56) References Cited

U.S. PATENT DOCUMENTS

| | | | |
|---|---|---|---|
| 4,860,342 A | 8/1989 | Danner | |
| 5,745,761 A * | 4/1998 | Celi et al. | 719/323 |
| 5,831,606 A * | 11/1998 | Nakajima et al. | 715/841 |
| 5,991,822 A * | 11/1999 | Mealey et al. | 719/327 |
| 6,008,806 A * | 12/1999 | Nakajima et al. | 715/744 |
| 6,160,550 A * | 12/2000 | Nakajima et al. | 715/745 |
| 6,240,168 B1 | 5/2001 | Stanford et al. | |
| 6,518,957 B1 | 2/2003 | Lehtinen et al. | |
| 6,603,855 B1 | 8/2003 | Cannon et al. | |
| 7,106,472 B2 * | 9/2006 | Gomez et al. | 358/1.15 |

(Continued)

FOREIGN PATENT DOCUMENTS

EP 0772327 A2 5/1997

(Continued)

OTHER PUBLICATIONS

Anonymous, International Search Report in Corresponding EP Application No. EP 04 00 9868, Aug. 30, 2004.

*Primary Examiner*—Li B Zhen
*Assistant Examiner*—Qing-Yuan Wu
(74) *Attorney, Agent, or Firm*—Workman Nydegger (57) ABSTRACT

Described is a system and method by which an auxiliary computing device having an auxiliary display platform that displays information corresponding to data that originated on the main computer system may be extended by a device manufacturer. Extended hardware is added to the device, such as a radio receiver and/or an audio decoder. The auxiliary display platform is layered and extensible at each layer, and includes an extensible hardware abstraction layer that is extensible to support extended hardware if needed, and a driver layer that is extensible by adding driver code for the extended hardware. A runtime layer is also extensible to support the extended hardware as needed, as are libraries, the auxiliary shell program and other managed code. The client API is also extensible to allow applications on the main computer system to communicate with extended hardware via the device runtime layer.

20 Claims, 7 Drawing Sheets

U.S. PATENT DOCUMENTS

2005/0005067 A1 * 1/2005 Culter et al. ................ 711/118

FOREIGN PATENT DOCUMENTS

| EP | 0777394 A1 | 6/1997 |
| EP | 0838934 A1 | 4/1998 |
| EP | 0772327 A3 | 2/1999 |
| WO | WO9602049 A1 | 1/1996 |
| WO | WO 03/085960 * 10/2003 |

* cited by examiner

EXTENSIBLE ARCHITECTURE FOR AUXILIARY DISPLAYS

FIELD OF THE INVENTION

The invention relates generally to computer systems, and more particularly to auxiliary computing devices that connect to a main computer system.

BACKGROUND OF THE INVENTION

U.S. Pat. Nos. 7,240,228 and 7,221,331 are generally directed towards the concept of computer systems having auxiliary processing and auxiliary mechanisms that provide some auxiliary computing functionality. For example, a small LCD on the lid or side of a laptop computer can provide its owner with useful information, such as a meeting location and time, even when the main computer display is not easily visible, e.g., when a laptop computer's lid is closed and/or the main computer is powered down. Controls such as buttons may be provided to allow the user to interact with the auxiliary device to view different types of data, such as to scroll through appointments among calendar data, read email messages, read directions, and so forth.

Somewhat similar to an auxiliary LCD screen built into a mobile host computer, a mobile telephone, a music playing device, a pocket-sized personal computer, a personal digital assistant and so forth can serve as an auxiliary device to a main computer when connected to it physically and/or via a wireless (e.g., Bluetooth or infrared) link, as long as the device is programmed to allow its display and/or other functionality to be leveraged by the main computer. In general, any device with I/O capabilities that can interface in virtually any way with a computer system can potentially serve as an auxiliary computing device.

However, there are many varieties of devices that can serve as an auxiliary display for a computer system. As a result, there are many ways to configure such a device internally. This creates a difficulty for device manufacturers (sometimes referred to as independent hardware vendors, or IHVs), in that users will want their device to serve as an auxiliary display, however the manufacturer needs to be able to have the device perform its desired functionality. Thus the device will need to be designed differently whether it is primarily an audio player, a GPS (global positioning system) receiver, a telephone, a digital picture frame, and so on. Heretofore, the only way to be able to customize hardware in the system yet still use the device as a full-featured auxiliary display was for the manufacturer to write very large amounts of code to integrate their hardware with other existing firmware that contained auxiliary display functionality. What is needed is a computing architecture that lets a device work as a full-featured auxiliary display when appropriate, yet is extensible so that a manufacturer is able to add desired functionality, as well as to innovate and differentiate its devices from other manufacturer's devices.

SUMMARY OF THE INVENTION

Briefly, the present invention provides a computing architecture for auxiliary displays that includes different layers of code, each of which device manufacturers can independently extend as desired, depending on their particular needs. Along with the architecture, the present invention allows device manufacturers to customize the hardware components in a manner that only requires a significantly reduced (e.g., minimal, if any) amount of firmware changes. Examples of customization include integration of a radio receiver or transceiver such as a radio for mobile communications, a SPOT radio, Bluetooth radio, and/or GPS receiver; other hardware includes a temperature sensor, audio decoders (e.g., for digital signal processing), additional storage and/or other hardware, such as indicators, into the device.

At a low level above the hardware components, a HAL (hardware abstraction layer) allows higher-level code to be written in a hardware-independent manner. The HAL may be extended as needed to support customized hardware. Because the HAL abstracts hardware differences, a device manufacturer can reuse a driver running at a higher level among many types of devices without having to significantly customize the driver for every class of device.

Above the drivers, other device software includes a common language runtime, such as TinyCLR, which comprises a relatively smaller scale implementation of the .NET common language runtime environment. Managed code that runs on the common language runtime will run on whatever platform the common language runtime runs on, which is made possible by the HAL (hardware abstraction layer) for that platform, e.g., a HAL for a platform based on an ARM7 chip. Because the majority of the firmware is written in managed code, it is also independent of the type of hardware it runs on. By controlling a majority of the device firmware and including the HAL and CLR in the architecture, device manufacturers may reuse existing software without any change, which is important to provide a high quality, consistent experience between various types of devices that serve as auxiliary displays.

By separating the architecture into layers, device manufacturers only need to extend code in an appropriate layer (or layers) in the architecture. For example, if the change is a new CPU, then the HAL needs to be adapted. However, if the change is to add a piece of hardware without changing the CPU for which a HAL exists, then possibly only a proper driver for the hardware and other corresponding software to run on the device and control that hardware is required. Certain applications that cannot be written in managed code, such as for performance reasons, e.g., involving high speed media buffering, can be written in native code such as C or C++ and essentially extend the CLR.

Device manufacturers (hardware manufacturers) that are interested in adding additional capabilities to the auxiliary display platform add hardware, thus extending the existing device firmware and any other code as needed. The impact to the existing (e.g., provided by another vendor) auxiliary display firmware is minimal.

Additionally, the platform is extensible as needed to adjust for the varied hardware from the perspective of the client auxiliary device API set provided on the main computer system. To this end, a simple and extensible mechanism using the client API is provided for communicating between device software that is provided by device manufacturer and the main computer system. This gives the device manufacturer the ability to provide an end-to-end implementation of a specific feature requiring special hardware using the platform. The API extensibility allows the device manufacturers and independent software vendors to develop client applications on the main computer system that can interact with the customized hardware on the device, without requiring specialized APIs.

More particularly, an extensibility model requires "endpoints" to be specified before a client application running on the main computer system can send data to the device. By having the device manufacturer provide specialized firmware to advertise an endpoint on the device, software on the main computer system can identify devices having the special hardware capability, and open a communication channel directly to that endpoint. The client API is designed such that the type of data transported between the client application and the device is not relevant. The end-to-end platform thus provides hardware extensibility with lesser amounts of effort on the part of the device manufacturer.

Other advantages will become apparent from the following detailed description when taken in conjunction with the drawings, in which:

DETAILED DESCRIPTION

Exemplary Operating Environment

Figure 1:
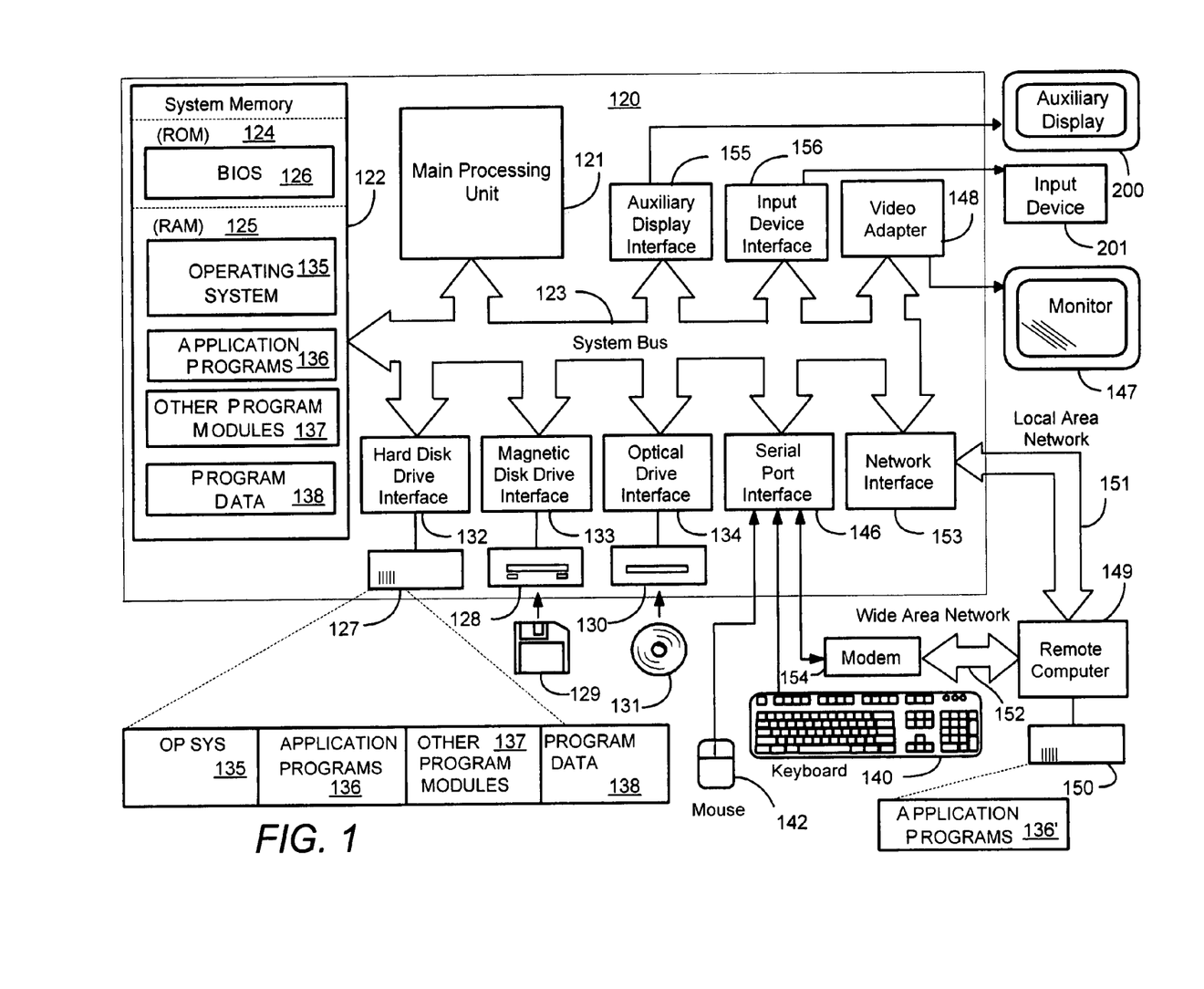
FIG. 1 is a block diagram representing a general purpose computing device in the form of a conventional personal computer system into which the present invention may be incorporated.

FIG. 1 is a block diagram representing a computing device 120 in the form of a main personal computer system into which the present invention may be incorporated. Those skilled in the art will appreciate that the personal computer system 120 depicted in FIG. 1 is intended to be merely illustrative and that the present invention may be practiced with other computer system configurations, including hand-held devices, multi-processor systems, microprocessor-based or programmable consumer electronics, network PCs, mini-computers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 120 included a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120. Although the exemplary computer system described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMS) and the like may also be used in the exemplary computer system.

A number of program modules may be stored on the hard disk, magnetic disk 129, optical disk 131, ROM 124 or RAM 125, including an operating system 135 (such as Windows® XP), one or more application programs 136 (such as Microsoft® Outlook), other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. An auxiliary display/device 200 is an additional output device, and may, for example, be connected to the system bus 123 via an auxiliary display interface 155.

An auxiliary display may also connect to a main computing device 120 through a serial interface or by other interfaces, such as a parallel port, game port, infrared or wireless connection, universal serial bus (USB) or other peripheral device connection. An input device 201 in FIG. 1 may provide one or more actuators to interface with and/or control the auxiliary display 200, and for example may be connected to the system bus 123 via input device interface 156, which may be a serial interface, or by other interfaces, such as a parallel port, game port, infrared or wireless connection, universal serial bus (USB) or other peripheral device connection.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

It should be noted that the computer system need not be fully operational for an auxiliary device to work in accordance with the present invention. Indeed, an auxiliary device may still work when the computer is powered down, at least to a default extent or to an extent configured by a user, such as when the computer system is in a sleep state or a hibernate mode, and/or when the user has not yet logged on or is otherwise locked out of the system via security mechanisms.

The auxiliary display/device 200 may supplement the main display and may also serve as a surrogate display when the main display is shut down or otherwise not operational (e.g., disconnected), to give the user some information. For example, information such as how to power up the main display might be helpful, as would a room number and/or directions to a meeting on an auxiliary display device connected to a mobile computer that the user can view when the main display is off and/or not easily visible (e.g., the lid of a laptop is closed). The auxiliary device may play audio and/or video, show images, show calendar information, show emails and so forth.

To enable and control communication in these powered-down modes, firmware may exist, stored in non-volatile memory, which when loaded and operated on by a secondary processor, enables the auxiliary display, along with other auxiliary components to be used, as long as some power is available. Note that as used herein, the terms "firmware" and "device hardware" are essentially equivalent, and can be generally considered as representing the auxiliary memory, the code therein and/or the auxiliary processor on which it runs.

Figure 2A:
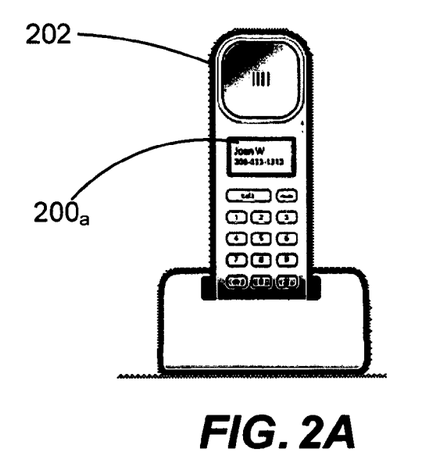
FIGS. 2A-2E are exemplary illustrations generally representing locations for placement of the auxiliary display on various devices.
Figure 2B:
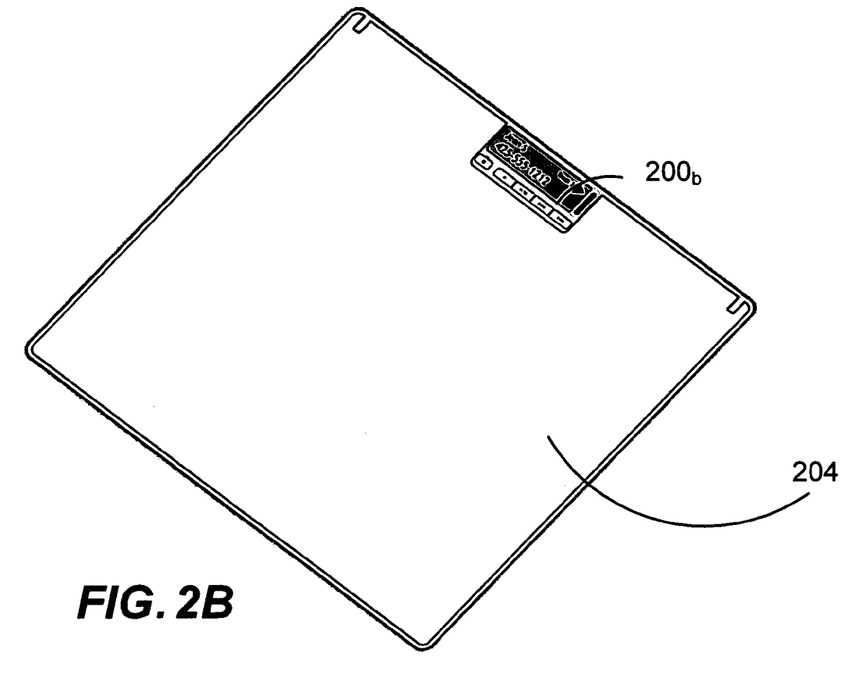
Figure 2C:
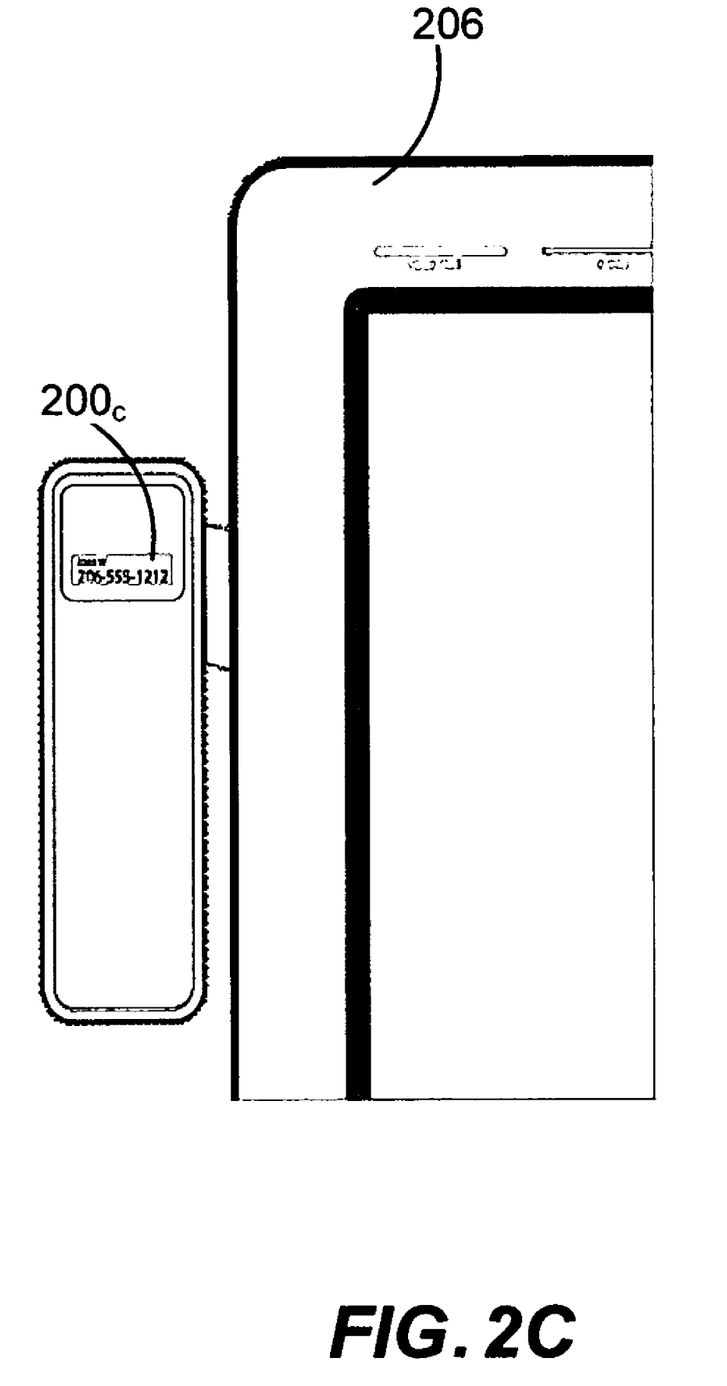
Figure 2D:
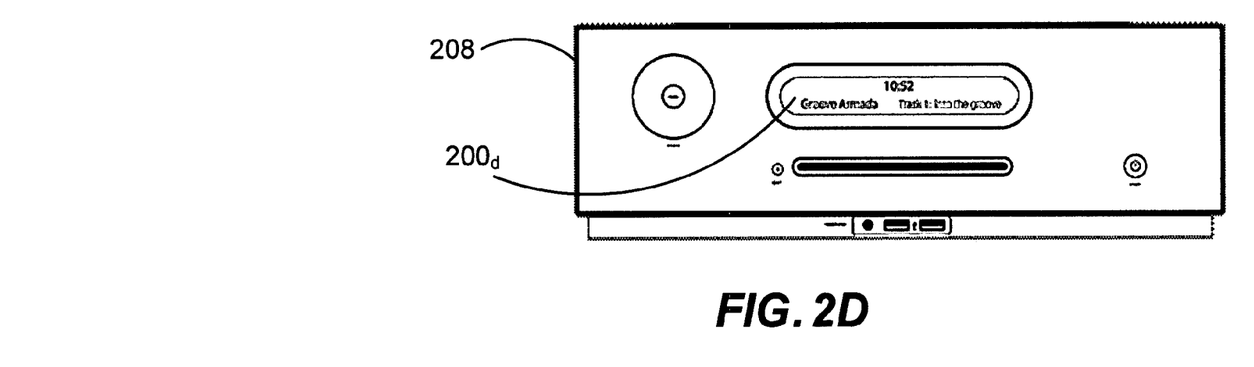
Figure 2E:
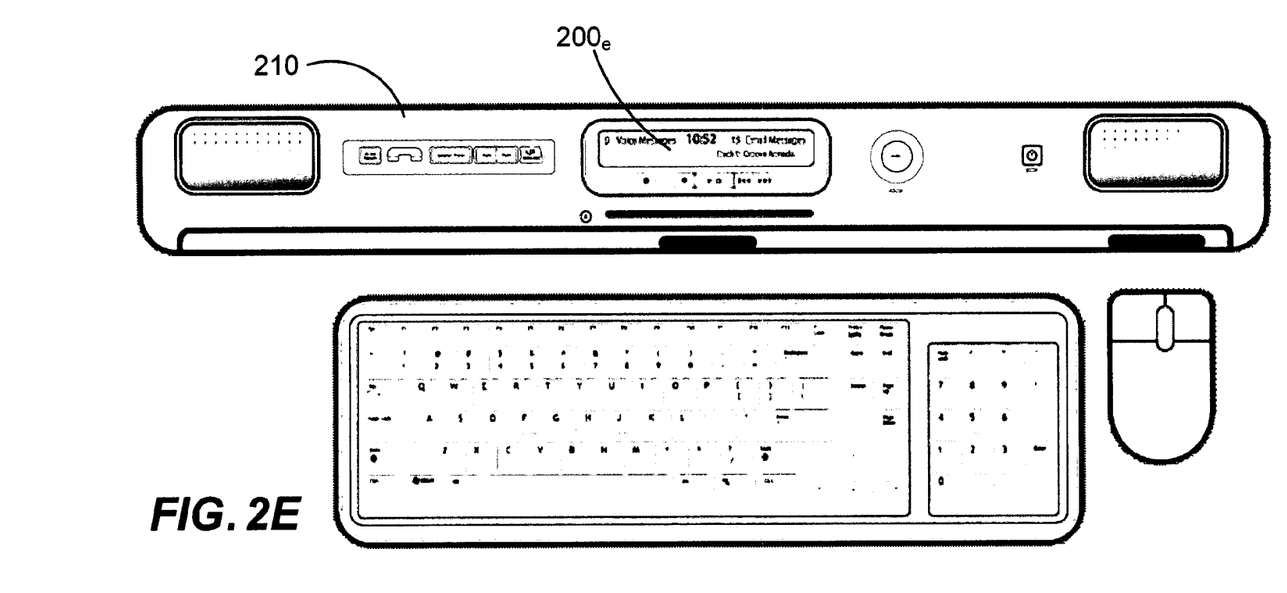

FIGS. 2A-2E illustrate exemplary locations on or associated with computing devices for placement of auxiliary display screens $200_a$-$200_e$, respectively. As represented in FIGS. 2A and 2B, an auxiliary display screen $200_a$ may be placed on the front, back or other surface of a standalone (landline or mobile) phone 202, (which need not be physically coupled if otherwise linked such as via Bluetooth technology) and/or another auxiliary display screen $200_b$ placed on the edge or lid of a mobile computer 204 or tablet computing device (not shown). Another place for an auxiliary display screen $200_c$ (FIG. 2C) may be on a phone mounted on a computer or a peripheral device attached to a computer such as on monitor 206 or on a keyboard (not shown). FIGS. 2D and 2E illustrate additional placements of auxiliary display screens $200_d$ and $200_e$ on the front panel of a standalone console 208 connected to a computer, or some other housing 210 (such as a housing for the motherboard), respectively. Those skilled in the art will appreciate that an auxiliary display screen may be placed on any surface of any computing device or other device having display capabilities, such as placed on a watch with a wireless or other connection to a computer, on a remote control device, on a remote wall-mounted unit, and so forth. Indeed, the auxiliary display need not be physically close to the main computer system, as the connection may be over a LAN or WAN, or even over the internet.

As should be apparent from FIGS. 2A-2E, an auxiliary display may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 200. These other computing or communication devices include general purpose computers, cell phones, and handheld devices such as a pager or a personal digital assistant (PDA). Additionally, the present invention may use a virtual auxiliary display implemented within an area of the onscreen display of the computing device 120 (e.g. a screensaver or a component of the graphical user interface) as the auxiliary display 200, including before a user has logged in. The auxiliary display 200 may include a combination of any of the forms described above, and also be physically or logically combined with indicators such as one or more LEDs and/or used in conjunction with a virtual auxiliary display.

An auxiliary device may provide functionality even without a screen, or when its screen is powered down. For example, an auxiliary device may play audio, collect data (e.g., for later download back to the main computer system), perform calculations and so forth. Also, the display may comprise one or more LEDs or the like rather than a full screen. Thus, although many benefits and advantages arise from having an auxiliary display screen, and thus an auxiliary device may be referred to herein as an auxiliary display, a display is not required. In general, an auxiliary display, as referred to herein, may be composed of essentially anything that can be sensed, including any visual, audible, and/or tactile representations. Examples of types of devices that can serve as an auxiliary display device include a separate computer system, displays on laptop lids, mobile phones, pocket-sized personal computers, digital image-based picture frames, kitchen displays, televisions, media players, clocks including alarm clocks, watches and so forth. Other types of devices include auxiliary devices embedded within or using the main display of a consumer electronics device, (such as a refrigerator, home theater receiver, DVD player, and so forth), wall displays, automotive, transportation or other vehicular units (e.g., using displays already in a car/train/plane as an auxiliary display), keyboards or other input devices of the main computer system, PDAs (including non-cellular telephone PDAs), and the like.

Extensible Architecture for Auxiliary Displays

Figure 3:
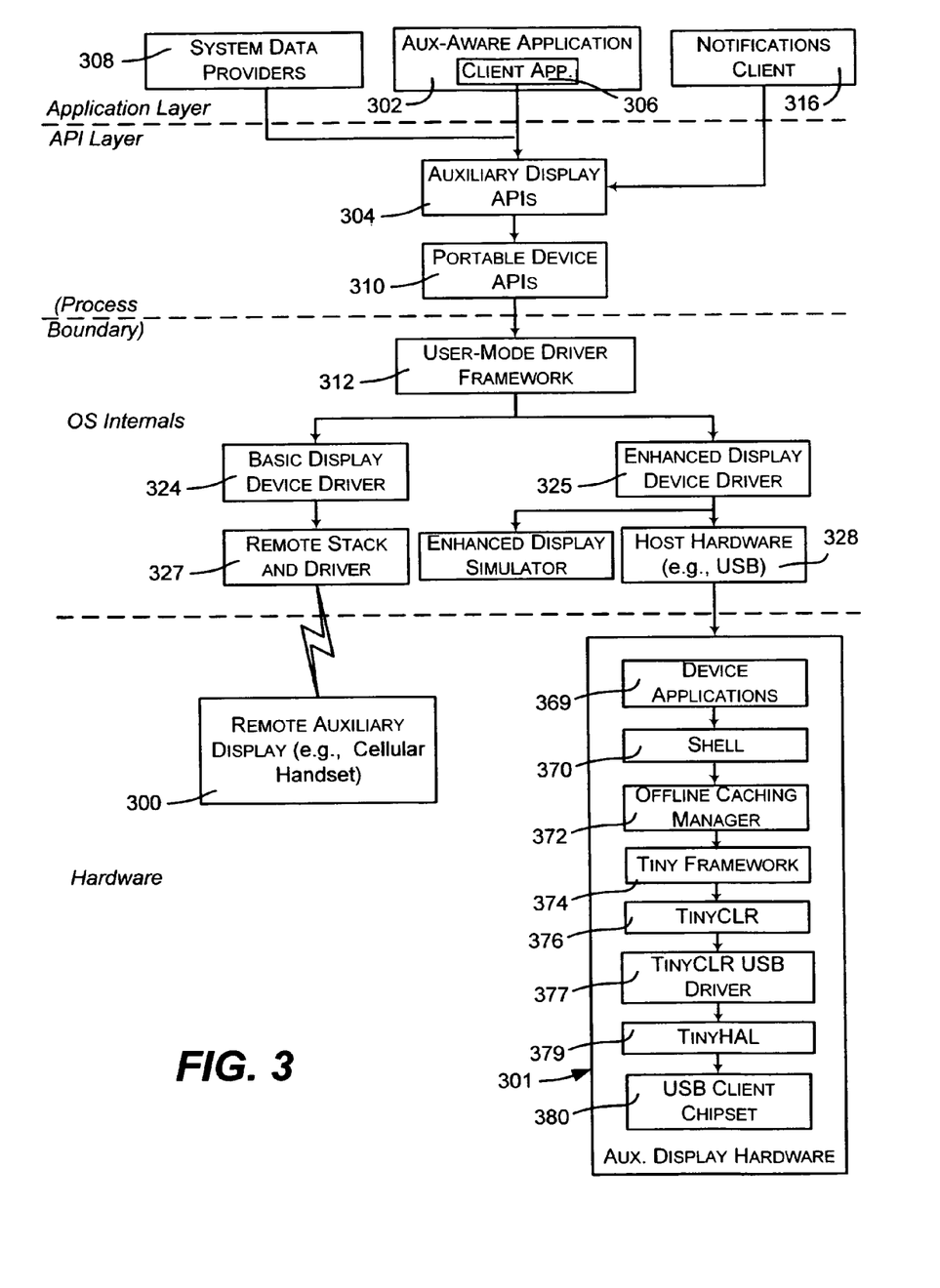
FIG. 3 is a block diagram generally representing an example implementation by which application programs on a main computer system can exchange data with the firmware of an arbitrary auxiliary display device in accordance with an aspect of the present invention.

Turning to FIG. 3 of the drawings, there is shown an example implementation that exposes auxiliary devices 300 and/or 301 to clients comprising application programs 302 and other programs (e.g., operating system components) via an auxiliary display API set 304. The API set 304 provides APIs for various functions, including registering a client application 306 (a component of the program or possibly the program itself) with the system, sending content to the attached devices, sending notifications to the attached devices, and receiving events from the attached devices. Events may include navigation events, content request events, content change events, and so forth.

The API layer 304 is written on a portable device API set 310, which communicates with the device's driver process via a user-mode driver framework 312. The portable device API set 310 maps the auxiliary display into a category of portable devices and it allows enumeration of the device's capabilities. This is encapsulated within the user-mode driver, however, and not exposed to the client application 306. Other (optional) components shown in FIG. 3 include a notifications client 316 that can provide notifications on the auxiliary display. For example, even when an application program such as a calendar program is not running, it may be desirable to provide scheduled notifications corresponding to that program; the notifications client 316 enables such scenarios.

Turning to the hardware manufacturer's perspective, in general, each auxiliary device vendor provides a corresponding auxiliary device driver 324, although the device driver may be supplied by the provider of the auxiliary display platform. Certain types of auxiliary devices are considered "enhanced" devices because they are configured with certain firmware that among other things is generally compatible with any information that can be received via the API set 304. Thus, a generic driver may be provided for such devices, although as described below, this driver may be extended and/or other drivers added.

In any event, the user mode driver framework provides a device driver interface (DDI) for coupling device drivers (e.g., 324 and 325) to the auxiliary display platform. The drivers then forward (and return) data corresponding to the API-received information to an appropriate hardware interface (transport) for communication to the auxiliary display device. For example, in FIG. 3, the device driver 324 is shown as forwarding data (via a previously defined protocol) to the remote stack and driver 327 for wireless (e.g., Bluetooth, Wi-FI, AM/FM infrared and so forth) communication to the device 300, whereas the device driver 325 is shown as forwarding data to USB-based hardware 328, although other types of transports including network transports such as TCP/IP-based transports are feasible. Note that a user-mode driver may work for all enhanced displays, regardless of connection type, however it is likely more straightforward to use one driver per device per connection type. Further note that as represented in FIG. 3, multiple devices may be coupled to a computer to serve as an auxiliary display at the same time. A user may configure (e.g., via a control panel or the like of system data providers 308) which client application's data is displayed on which devices. The system data provider 308 also supplies system information such as time data, wireless signal strength data and/or battery level data to auxiliary displays.

As also shown in FIG. 3, an "enhanced" display 301 is one that runs a particular firmware stack referred to herein as the auxiliary display platform. For example, in one present implementation, such a firmware stack includes a TinyCLR component and supports TinyCLR object serialization.

In the example implementation represented in FIG. 3, to navigate and display cached content, device applications 369 and a shell program 370 run on a TinyCLR framework 374 and runtime component 376, which interprets, navigates, and displays the data. The TinyCLR runtime component 376 is shown above at least one driver 377 and TinyHAL, as described below with reference to FIG. 4.

In general, the shell program 370 provides a home page, non-client area, menus and the general look and feel of the auxiliary display device. The data provided may be in the form of or modified into a directed graph of screens, each of which is a visual tree of TinyCLR View objects rooted by a TinyCLR Form object. The shell layer receives button events from the lower layers of the firmware, interprets them, and navigates around in the data as appropriate. The shell program 370 also accepts notification requests from the main computer system via the auxiliary display platform as described above, and issues requests to the main computer system to provide new content when it learns from the caching manager 372 that content is needed (e.g., missing). The shell program 370 also displays timed notifications, which can occur when the main computer system is not connected. Note that the rendering engine 370 may also be extensible such that an application may provide custom code that is capable of rendering that application's data.

The offline caching manager 372 comprises an assembly, written on top of the TinyCLR 376, which manages the cache of data items stored on the device. This component also performs some memory management, dealing with the fact that system application programs may provide more data than the device can store. If the firmware modifies the data cache, this component tracks that information, and posts events to the application program on the system to let it know either immediately if the main computer system is online, or if not online, when the machine comes back online. The cache manager may be exposed to the driver 360 via an interface.

Figure 4:
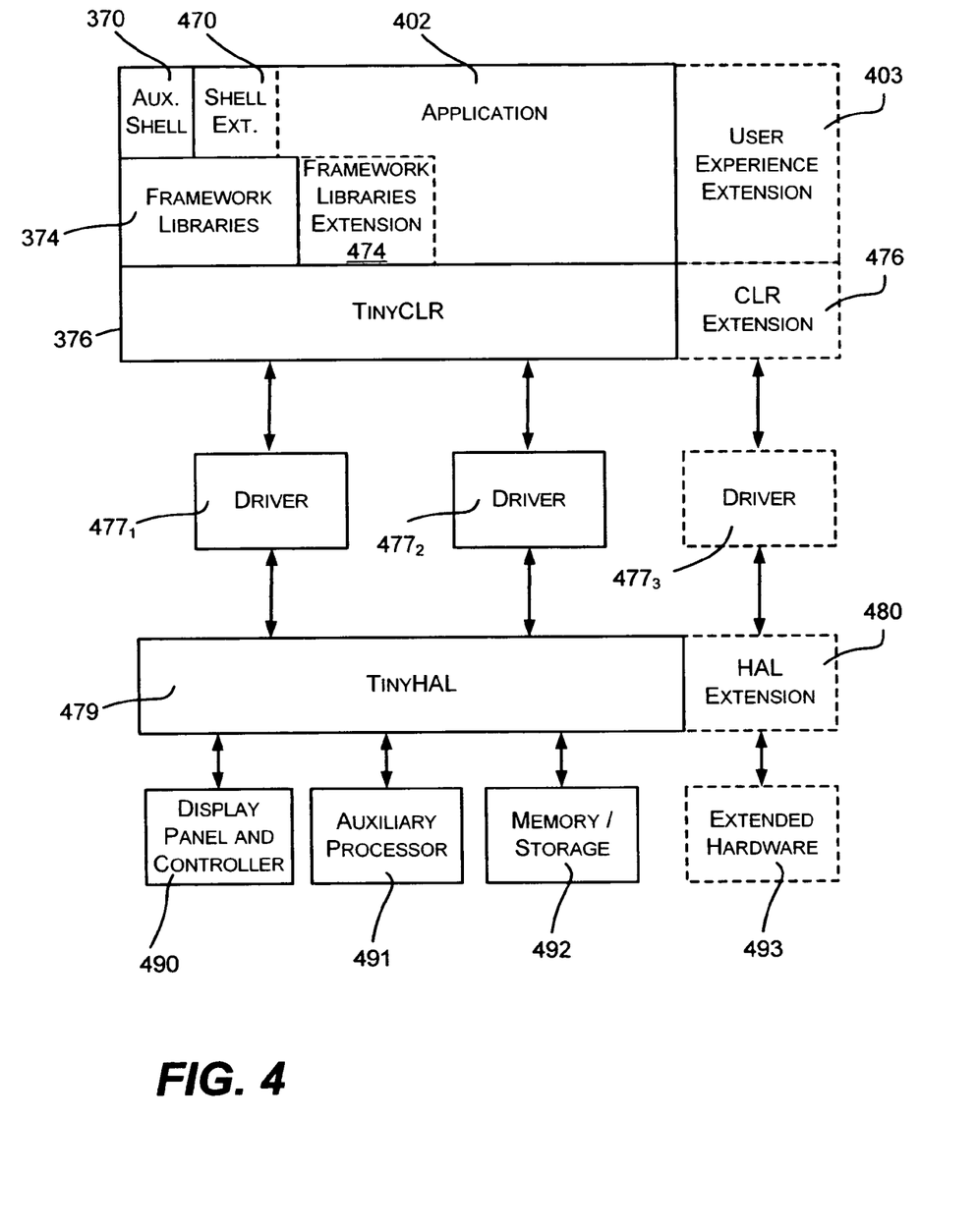
FIG. 4 is a block diagram generally representing an example layered architecture constructed in accordance with an aspect of the present invention.

In accordance with an aspect of the present invention, the various layers (as generally represented in FIG. 4), are separate and each may be separately extended as needed by a device manufacturer to support extended hardware. Note that much of FIG. 4 generally corresponds to the firmware stack of FIG. 3. By separating the architecture into layers, device manufacturers only need to extend code in an appropriate layer (or layers) in the architecture as needed for extended hardware.

More particularly, in addition to the display panel and controller 490, auxiliary processor 491 and memory 492, extended hardware 493 is added by the device manufacturer to customize the device. Examples of customization include integration of one or more of the following, such as a SPOT radio, Bluetooth radio, GPS receiver, temperature sensor, audio decoder, audio encoder, additional storage, a biometric sensor such as a fingerprint reader, an accelerometer, RFID tags/reader, presence detection, an interface to storage arrays/system management (e.g., access to a system bus such as SMbus that can provide system information, or access to large arrays of storage), a battery (e.g., the device's own power supply, rather than shared with main computer system), an infrared transceiver, an RF transmitter (e.g., an RF remote control), a microphone, and/or other hardware such as indicators into the device. As will be understood, manufacturers may customize the hardware components in a manner that only requires a significantly reduced (e.g., minimal, if any) amount of changes to the auxiliary device firmware stack.

Above the hardware components, the HAL (e.g., the hardware abstraction layer) allows the higher-level code to be written in a hardware-independent manner. As used herein, the terms "high-level" and "low-level," "above" and "below" and the like when referring to a code stack are similar to those used in other computing scenarios, wherein in general, the lower a software component is relative to higher components, the closer the lower component is to the hardware. As represented in FIG. 4, the base HAL may be extended by HAL extension code 480 as needed to support customized hardware. Note that it is not always necessary to extend the HAL, as, for example, an unused general purpose I/O port or the like may be available for operating the device through the existing HAL 479. Otherwise, a port can be managed via the extended HAL.

Above the HAL are drivers $477_1$-$477_3$, including a custom driver added for the extended hardware $477_3$. Note that although FIG. 4 depicts only one driver $477_3$ and one extended hardware block 493 there may be more drivers and/or hardware added. Further, it should be noted that instead of adding another driver, it is equivalent to modify existing driver code to perform the added functionality that is desired. As is known in general, because the HAL 479 abstracts hardware differences, a device manufacturer can reuse the custom driver 477₃ (or a modified driver) running among many types of physical devices without having to customize the driver 477₃ for every different class of device.

Above the drivers, other device software includes the common language runtime (CLR), such as the TinyCLR 376, which comprises a relatively smaller scale implementation of the .NET common language runtime environment. Managed code that runs on the common language runtime will run on whatever platform the common language runtime runs on, which is made possible by the HAL (hardware abstraction layer) for that platform, e.g., a HAL for a platform based on an ARM7 chip. Because the majority of the firmware is written in managed code, it is also independent of the type of hardware on which it runs. By controlling a majority of the device firmware and including the HAL and CLR in the architecture, device manufacturers may reuse existing software without any change, which is important to provide a high quality, consistent experience between various types of devices that serve as auxiliary displays.

The application program 402 may be a custom application that works with the extended hardware 493. However, it is also possible to extend the user experience by extending an already-written application program, as represented in FIG. 4 by user experience extension. By way of example, consider that the extended hardware comprises a simple indicator that lights upon receipt of a notification. The program 402 that receives the notifications can be extended to illuminate the indicator when a notification is received, and extinguish it when the notification is dismissed.

Certain applications that cannot be written in managed code, such as for performance reasons, can be written in native code such as C or C++ and essentially extend the CLR, as represented in FIG. 4 by the CLR extension 476. While the CLR may provide APIs for use by the framework extension 474, such as read, write, open, close, I/O control and so forth, this may not be sufficient for certain applications. For example, high-speed media buffering may not be able to be accomplished fast enough if copied from application program-level buffers through the CLR to lower-level digital signal processing buffers. To avoid such a copying expense, native code in the CLR extension 476 may fill a single set of buffers.

The auxiliary shell program 370 may also be extended, by using APIs on the main computer system and downloading code to the device. A typical reason for doing so is to add references to the customized functionality, such as icons, summary text, context-sensitive text, and menu items. For example, an auxiliary display device that is also configured as an audio player may also allow other data to be recorded, games to be played and an appointment calendar maintained. Icons and menu items may be added via the shell extension 470 to allow these different application programs to be easily run. The framework libraries 374 may also be extended via a corresponding extension 474.

Figure 5:
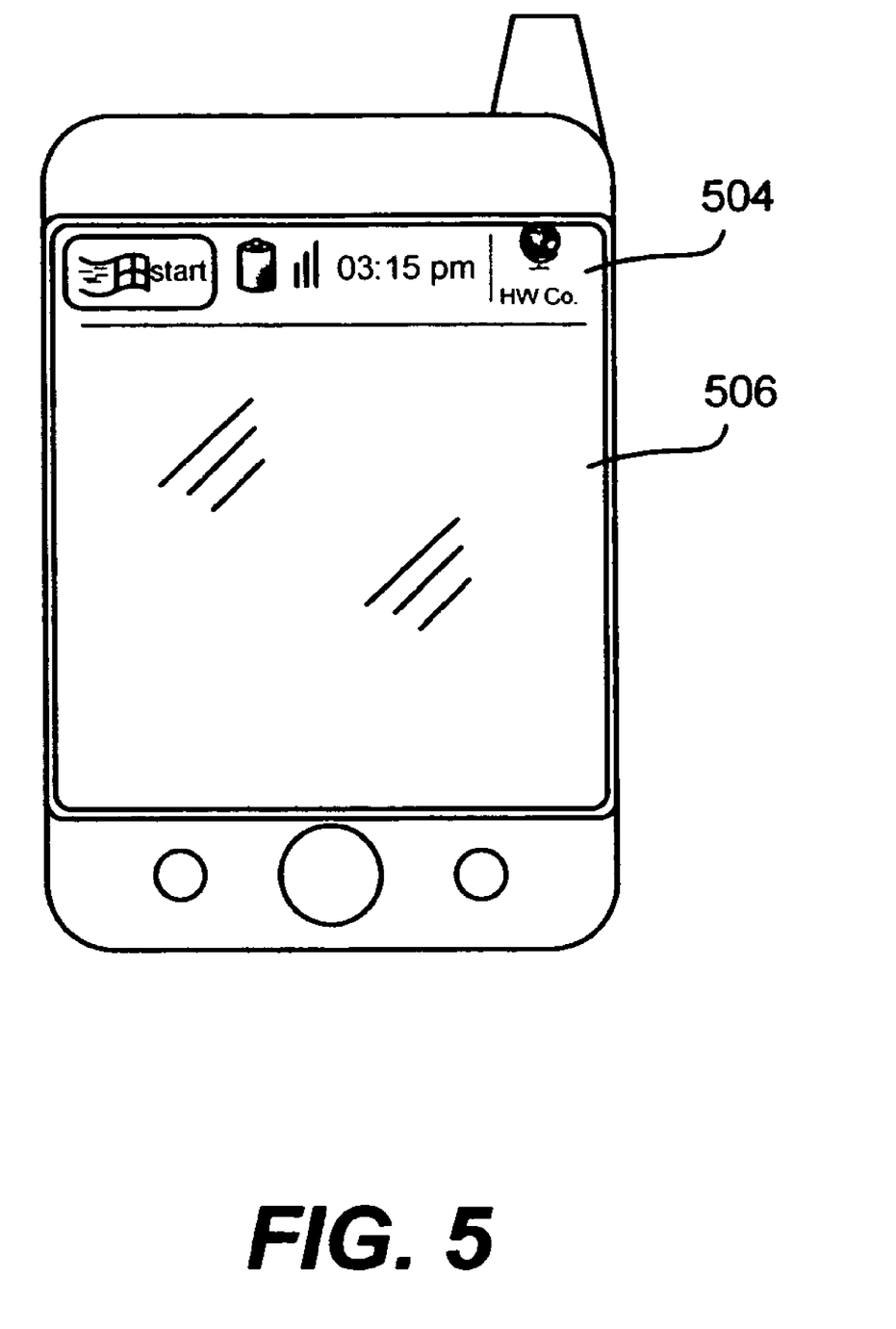
FIG. 5 is an example representation of a hardware display with a display screen showing how the device manufacturer may customize the screen in accordance with an aspect of the present invention.

Note that as represented in FIG. 5, in one implementation where the auxiliary display screen has sufficient room, a region 504 of the screen 506 of the auxiliary display device is reserved for the device manufacturer to show some information, such as a company logo. The region may be used for showing information corresponding to the extended hardware, e.g., a GPS receiver may show some GPS data in the region, or an icon that when selected can quickly call up GPS data to the main screen.

Returning to FIG. 3, the platform is additionally extensible on the main computer system's client auxiliary display API sets 304 and/or 310. To this end, a simple and extensible mechanism using the client API is provided for communicating between device software that is provided by the device manufacturer and the main computer system. This gives the device manufacturer the ability to provide an end-to-end implementation of a specific feature requiring special hardware using the platform. The API extensibility allows the device manufacturers and independent software vendors to develop client applications 306 and other programs 302 on the main computer system that can interact with the customized hardware on the device, without requiring specialized APIs.

More particularly, an extensibility model requires "endpoints" to be specified before a client application 302 can send data to the device. By having the device manufacturer extend code in the auxiliary device firmware to advertise an endpoint on the device, software on the main computer system can identify devices having the special hardware capability, and open a communication channel directly to that endpoint. The client API is designed such that the type of data transported between the client application and the device is not relevant, e.g., text, binary data, media, objects and so forth may be communicated. The end-to-end platform thus provides hardware extensibility with lesser amounts of effort on the part of the device manufacturer.

For an enhanced device, essentially the only requirement is to establish a data pipe between endpoints and pass in serialized objects or the like. One way to accomplish this is to use a technology referred to as .NET remoting, which allows code on the main computer system to make method calls to classes on the auxiliary device. Thus, for example, an application on the main computer system can call into an auxiliary device configured with GPS capabilities to obtain GPS information on the main computer system.

As described above, content may be downloaded to a cache on the enhanced device, and the device itself will then handle the content as desired. Note that this allows for disconnected usage, as well as having multiple applications running on the system provide content, generally with one application being run at a time to access the cached content on the auxiliary display.

As can be seen from the foregoing, the present invention provides an auxiliary display platform having layers that can be extended as needed to support additional hardware. At the same time, the auxiliary display platform enables manufacturers of hardware devices to have those devices used as full-featured auxiliary displays, yet is extensible with little if any change to the firmware, so that a manufacturer is able to easily add desired functionality, as well as to innovate and differentiate its devices from other manufacturer's devices. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. An auxiliary display device capable of coupling to a main computer system, the auxiliary device comprising:
   a processor; and
   memory storing an auxiliary platform for displaying data received from any main computer system having a particular operating system, the auxiliary platform being extensible to support extended hardware that is incorporated into the auxiliary display device, the auxiliary platform including:

a hardware abstraction layer that is specific to the processor and that abstracts functions provided by the processor from higher-level software on the auxiliary display device;

a driver layer that includes standard driver code for driving an auxiliary display of the auxiliary display device, the driver layer also being extensible by including additional driver code for driving extended hardware that may be included in the auxiliary display device;

a common language runtime layer for running programs that are written in managed code, wherein the common language runtime layer is extensible by providing programs that are written in native code to support extended hardware as needed; and     auxiliary device program code that displays the data received from the main computer system or data that is generated by extended hardware that is included in the auxiliary display device.

2. The auxiliary display device of claim 1 wherein the auxiliary display device comprises a mobile communications device.

3. The auxiliary display device of claim 1 wherein the auxiliary display device comprises a device from among a set of device types containing: a separate computer; a mobile communications device; a secondary display screen with button actuators; a watch; a wall display; a display screen; a digital picture frame; an alarm clock; a television; a radio; a watch; a media player; a device embedded within or using the main display of a consumer electronics device; automotive, transportation or other vehicular units; keyboards or other input devices of the main computer system; a pager; and a personal digital assistant.

4. The auxiliary display device of claim 1 wherein the managed code controls the extended hardware that is included in the auxiliary display device.

5. The auxiliary display device of claim 4 wherein the main computer system communicates with extended hardware included in the auxiliary display device using an application program interface on the main computer system that is extensible to transfer data between software code running on the main computer system and the managed code on the auxiliary display device.

6. The auxiliary display device of claim 5, wherein the managed code on the auxiliary display device advertises an endpoint on the auxiliary display device such that the software code running on the main computer system establishes a communication channel directly to the endpoint to communicate with the extended hardware.

7. The auxiliary display device of claim 1 wherein the auxiliary platform further includes an auxiliary shell program that is extensible to support the extended hardware.

8. The auxiliary display device of claim 1 wherein the auxiliary display includes a region reserved for displaying customized output received from extended hardware that is included in the auxiliary display device.

9. The auxiliary display device of claim 1 wherein the extended hardware corresponds to at least one hardware component of a set of components, the set containing: SPOT radio; Bluetooth radio; GPS receiver; temperature sensor; audio decoder; audio encoder; additional storage; a biometric sensor; an accelerometer; RFJD tags/reader; presence detection; an interface to storage arrays / system management; a battery; an RF transmitter; a microphone; a radio receiver; mobile telephone components; wireless communication components; wireless networking components; and an indicator.

10. In an auxiliary display device which is capable of coupling to a main computer system, a method for providing an auxiliary platform that includes standard firmware for displaying data received from a main computer system having a particular operating system and that is extensible to support the display of data received from extended hardware that is included within the auxiliary display device, the method comprising:

installing the auxiliary platform including a firmware stack on the auxiliary display device, the firmware stack including:

a hardware abstraction layer that is specific to a processor of the auxiliary display device and that abstracts functions provided by the processor from higher-level software on the auxiliary display device:

a driver layer that includes standard driver code for driving an auxiliary display of the auxiliary display device, the driver layer also being extensible by including additional driver code for driving extended hardware that may be included in the auxiliary display device;

a common language runtime layer for running programs that are written in managed code, wherein the common language runtime layer is extensible by providing programs that are written in native code to support extended hardware as needed; and         auxiliary device program code that displays the data received from the main computer system or data that is generated by extended hardware that is included in the auxiliary display device;

adding extended hardware to the auxiliary display device; and     extending the firmware stack to support the extended hardware.

11. The method of claim 10 wherein extending the firmware stack comprises including additional driver code at the diver layer for driving the added extended hardware.

12. The method of claim 10 wherein extending the firmware stack comprises extending the common language runtime layer by providing a program that is written in native code to support the added extended hardware.

13. The method of claim 12 wherein the program written in native code performs high-speed media buffering by copying data from a buffer at an application program level of the firmware stack to a lower level digital signal processing buffer.

14. The method of claim 10 wherein the firmware stack includes a shell program and wherein extending the firmware stack comprises extending the shell program.

15. The method of claim 10 wherein the firmware stack includes a framework library and wherein extending the firmware stack comprises extending the framework library.

16. The method of claim 10 wherein adding extended hardware to the auxiliary display device comprises configuring the computer device for mobile communications.

17. The method of claim 10 wherein adding extended hardware comprises adding at least one hardware component of a set of components, the set containing: SPOT radio; Bluetooth radio; GPS receiver; temperature sensor; audio decoder; audio encoder; additional storage; a biometric sensor; an accelerometer; RFTD tags/reader; presence detection; an interface to storage arrays / system management; a battery; an RF transmitter; a microphone; a radio receiver; mobile telephone components; wireless communication components; wireless networking components; and an indicator.

18. The method of claim 10 further comprising communicating data between a program running on the main computer system and custom software code running on the auxiliary display device that corresponds to the added extended hardware.

19. The method of claim 10 further comprising, displaying custom information on a region of the auxiliary display that is reserved for displaying customized output.

20. One or more computer storage media storing computer-executable instructions which when executed by a processor perform a method for providing an auxiliary platform that includes standard firmware for displaying data received from a main computer system having a particular operating system and that is extensible to support the display of data received from extended hardware that is included within the auxiliary display device, the method comprising:
  installing the auxiliary platform including a firmware stack on the auxiliary display device, the firmware stack including:
    a hardware abstraction layer that is specific to a processor of the auxiliary display device and that abstracts functions provided by the processor from higher-level software on the auxiliary display device;
    a driver layer that includes standard driver code for driving an auxiliary display of the auxiliary display device, the driver layer also being extensible by including additional driver code for driving extended hardware that may be included in the auxiliary display device;
    a common language runtime layer for running programs that are written in managed code, wherein the common language runtime layer is extensible by providing programs that are written in native code to support extended hardware as needed; and
    auxiliary device pro gram code that displays the data received from the main computer system or data that is generated by extended hardware that is included in the auxiliary display device;
  adding extended hardware to the auxiliary display device; and
  extending the firmware stack to support the extended hardware.

* * * * *